United States Patent
Fraser et al.

(10) Patent No.: US 7,640,186 B1
(45) Date of Patent: Dec. 29, 2009

(54) SYSTEMS AND METHODS FOR RESELLING ELECTRONIC MERCHANDISE

(75) Inventors: Stuart A. Fraser, Armonk, NY (US); Philip M. Ginsberg, New York, NY (US); Glenn D. Kirwin, Scarsdale, NY (US); Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 364 days.

(21) Appl. No.: 09/713,529

(22) Filed: Nov. 15, 2000

Related U.S. Application Data (60) Provisional application No. 60/165,873, filed on Nov. 16, 1999.

(51) Int. Cl.
*G06Q 30/00* (2006.01)
*G06F 21/00* (2006.01)

(52) U.S. Cl. .................. 705/26; 713/168; 705/51; 705/75

(58) Field of Classification Search .............. 705/1, 705/26–29, 39, 44, 50, 51, 53, 56–59, 75, 705/76; 713/156, 161, 168, 194, 200, 201
See application file for complete search history.

(56) References Cited

U.S. PATENT DOCUMENTS

| | | | | |
|---|---|---|---|---|
| 3,670,310 A | * | 6/1972 | Bharwani et al. ............... 707/3 |
| 5,038,284 A | | 8/1991 | Kramer ...................... 364/408 |
| 5,418,713 A | * | 5/1995 | Allen .......................... 705/32 |
| 5,646,998 A | * | 7/1997 | Stambler ..................... 380/25 |
| 5,675,734 A | * | 10/1997 | Hair ........................... 380/4 X |
| 5,710,887 A | * | 1/1998 | Chelliah et al. ............. 395/226 |
| 5,715,402 A | | 2/1998 | Popolo ...................... 395/237 |
| 5,717,989 A | | 2/1998 | Tozzoli et al. ................ 705/37 |
| 5,724,370 A | * | 3/1998 | Sferrazza et al. ............. 371/53 |
| 5,774,873 A | | 6/1998 | Berent et al. .................. 705/26 |
| 5,809,144 A | * | 9/1998 | Sirbu et al. .................... 380/25 |
| 5,835,896 A | | 11/1998 | Fisher et al. ................. 705/37 |
| 5,850,442 A | * | 12/1998 | Muftic ........................ 380/21 |

(Continued)

FOREIGN PATENT DOCUMENTS

JP            2003331139            11/2003

(Continued)

OTHER PUBLICATIONS

Gervais, Daniel J. "Electronic Rights Management and Digital Identifier Systems", The Journal of Electronic Publishing, Mar. 1999, vol. 4, Issue 3.

*Primary Examiner*—Suzanne D Barrett
(74) *Attorney, Agent, or Firm*—Glen R. Farbanish (57) ABSTRACT

A service is provided that verifies, repairs, and provides a resale mechanism for electronic merchandise over the Internet. A reseller sends in a request to sell electronic merchandise. The service provider may verify the authenticity of the merchandise. Next, depending on the reseller's requests, the service provider may verify the electronic merchandise and repair the electronic merchandise if the data is faulty. When the electronic merchandise is ready, the service provider may advertise the merchandise using a method specified by the reseller. Once there is a buyer, the service provider may notify the reseller, a transaction may occur, and the electronic merchandise and copyrights may be transferred from reseller to buyer.

32 Claims, 4 Drawing Sheets

U.S. PATENT DOCUMENTS

| | | | |
|---|---|---|---|
| 5,864,620 A * | 1/1999 | Pettitt | 380/4 |
| 5,889,868 A * | 3/1999 | Moskowitz et al. | 380/51 |
| 5,890,138 A | 3/1999 | Godin et al. | 705/26 |
| 5,960,411 A * | 9/1999 | Hartman et al. | 705/26 |
| 5,970,472 A * | 10/1999 | Allsop et al. | 705/26 |
| 6,012,045 A * | 1/2000 | Barzilai et al. | 705/37 |
| 6,029,141 A * | 2/2000 | Bezos et al. | 705/27 |
| 6,098,056 A * | 8/2000 | Rusnak et al. | 705/75 |
| 6,119,229 A | 9/2000 | Martinez et al. | |
| 6,128,600 A | 10/2000 | Imamura et al. | |
| 6,144,743 A * | 11/2000 | Yamada et al. | 705/1 X |
| 6,189,098 B1 | 2/2001 | Kaliski, Jr. | 713/168 |
| 6,226,618 B1 | 5/2001 | Downs et al. | |
| 6,263,318 B1 * | 7/2001 | Kimura et al. | 705/27 |
| 6,317,830 B1 * | 11/2001 | Stolz | 713/168 |
| 6,330,550 B1 * | 12/2001 | Brisebois et al. | 705/75 |
| 6,343,738 B1 * | 2/2002 | Ogilvie | 235/381 |
| 6,356,878 B1 * | 3/2002 | Walker et al. | 705/26 |
| 6,363,357 B1 * | 3/2002 | Rosenberg et al. | 705/26 |
| 6,385,596 B1 * | 5/2002 | Wiser et al. | 705/51 |
| 6,389,403 B1 | 5/2002 | Dorak, Jr. | |
| 6,418,421 B1 | 7/2002 | Hurtado et al. | |
| 6,460,020 B1 * | 10/2002 | Pool et al. | 705/26 |
| 6,469,239 B1 * | 10/2002 | Fukuda | 705/51 X |
| 6,490,567 B1 * | 12/2002 | Gregory | 705/39 |
| 6,493,683 B1 | 12/2002 | David et al. | 705/37 |
| 6,507,727 B1 * | 1/2003 | Henrick | 455/3.06 |
| 6,510,236 B1 * | 1/2003 | Crane et al. | 713/201 X |
| 6,510,513 B1 * | 1/2003 | Danieli | 713/156 |
| 6,535,919 B1 * | 3/2003 | Inoue et al. | 709/229 |
| 6,560,339 B1 * | 5/2003 | Iwamura | 380/201 |
| 6,560,581 B1 * | 5/2003 | Fox et al. | 705/51 |
| 6,564,253 B1 * | 5/2003 | Stebbings | 709/217 |
| 6,571,334 B1 * | 5/2003 | Feldbau et al. | 713/170 |
| 6,574,608 B1 * | 6/2003 | Dahod et al. | 705/26 |
| 6,574,609 B1 * | 6/2003 | Downs et al. | 705/50 |
| 6,611,812 B2 * | 8/2003 | Hurtado et al. | 705/26 |
| 6,728,729 B1 | 4/2004 | Jawa et al. | |
| 6,856,977 B1 | 2/2005 | Adelsbach et al. | |
| 6,944,600 B2 | 9/2005 | Stefik et al. | |
| 6,944,648 B2 | 9/2005 | Cochran et al. | |
| 6,948,070 B1 | 9/2005 | Ginter et al. | |
| 7,103,598 B1 | 9/2006 | Clement | |
| 7,175,079 B1 * | 2/2007 | Silverbrook et al. | 235/383 |
| 7,231,524 B2 | 6/2007 | Burns | |
| 7,349,871 B2 * | 3/2008 | Labrou et al. | 705/26 |
| 7,379,920 B2 * | 5/2008 | Leung et al. | 705/67 |
| 7,478,057 B2 * | 1/2009 | Alfano | 705/26 |
| 2001/0002485 A1 * | 5/2001 | Bisbee et al. | 713/167 |
| 2001/0034673 A1 * | 10/2001 | Yang et al. | 705/26 |
| 2001/0049647 A1 * | 12/2001 | Sheehan et al. | 705/37 |
| 2002/0013765 A1 * | 1/2002 | Shwartz | 705/39 |
| 2002/0023058 A1 * | 2/2002 | Taniguchi et al. | 705/57 |
| 2002/0049641 A1 * | 4/2002 | Kopelman et al. | 705/26 |
| 2002/0077956 A1 * | 6/2002 | Solheim | 705/37 |
| 2002/0095348 A1 * | 7/2002 | Hiroshige et al. | 705/26 |
| 2002/0111837 A1 * | 8/2002 | Aupperle | 705/5 |
| 2002/0116281 A1 * | 8/2002 | Costello et al. | 705/26 |
| 2002/0128975 A1 * | 9/2002 | Klemba et al. | 705/57 |
| 2002/0143646 A1 * | 10/2002 | Boyden et al. | 705/26 |
| 2002/0147656 A1 * | 10/2002 | Tam et al. | 705/26 |
| 2003/0050849 A1 * | 3/2003 | Keller et al. | 705/26 |
| 2003/0125964 A1 | 7/2003 | Chang et al. | |
| 2003/0135421 A1 * | 7/2003 | Cales et al. | 705/26 |
| 2003/0171995 A1 * | 9/2003 | Dezonno et al. | 705/26 |
| 2003/0204449 A1 | 10/2003 | Kotas et al. | |
| 2003/0225701 A1 | 12/2003 | Lee et al. | |
| 2004/0006519 A1 * | 1/2004 | Lee | 705/26 |
| 2004/0059644 A1 * | 3/2004 | Blau | 705/26 |
| 2004/0128241 A1 * | 7/2004 | Akama | 705/39 |
| 2004/0249746 A1 * | 12/2004 | Horowitz et al. | 705/39 |
| 2005/0188424 A1 | 8/2005 | Kizyma | |
| 2005/0240536 A1 | 10/2005 | Davis et al. | |
| 2005/0251491 A1 | 11/2005 | Medina et al. | |
| 2005/0273805 A1 | 12/2005 | Roever et al. | |
| 2006/0010075 A1 | 1/2006 | Wolf | |
| 2006/0101521 A1 | 5/2006 | Rabinovitch | |

FOREIGN PATENT DOCUMENTS

| | | |
|---|---|---|
| WO | WO 99/19819 | 4/1999 |
| WO | WO 99/46700 | 9/1999 |
| WO | WO 2004/079545 A2 | 9/2004 |

* cited by examiner

*NEW CUSTOMER ▼ [YES/NO]  — 52

*NAME: [ ]
ADDRESS: [ ]
CITY: [ ] STATE: [ ] ZIP CODE: [ ]
TELEPHONE: [ ]-[ ]-[ ]
— 54

*TYPE OF MERCHANDISE:          *METHOD OF SELLING:
▼ SOFTWARE                60 ▼ ADVERTISING
  MUSIC                        AUCTION
  VIDEO                        PERSONAL TRANS.
  IMAGE                        OTHER
  OTHER
— 56

*BRIEF DESCRIPTION: [          ]  — 58

MINIMUM SELLING PRICE: $ [ ]  — 62
PERFORM VERIFICATION: ▼ [YES/NO]   REPAIR: ▼ [YES/NO]  — 64, 66
*ATTACH FILE: [▼ BROWSE]  — 68
* MUST FILL OUT IF ALREADY A CUSTOMER  — 70

[SUBMIT] — 72    [CANCEL] — 74

*FIG. 3*

SYSTEMS AND METHODS FOR RESELLING ELECTRONIC MERCHANDISE

CROSS REFERENCE TO RELATED INFORMATION

This application claims the benefit of U.S. provisional patent application No. 60/165,873, filed Nov. 16, 1999, entitled SYSTEMS AND METHODS FOR RESELLING ELECTRONIC MERCHANDISE by Stuart A. Fraser, Philip M. Ginsberg, Glenn D. Kirwin, and Howard W. Luthick, which is hereby incorporated by reference herein in its entirety.

BACKGROUND OF THE INVENTION

The present invention relates to systems and methods for reselling electronic merchandise such as software, music, video, images, etc.

With the recent explosion in electronic communication, consumers have begun purchasing and receiving merchandise, such as software, music, video, images, etc., electronically without ever receiving a tangible copy of that merchandise. For example, a consumer that desires to purchase a new song by a musical artist may purchase and download an MP3 format copy of that song using a suitable Internet connection to a World Wide Web site, rather than purchasing and receiving a corresponding compact disc.

Unlike merchandise distributed on traditional media, such as records, tapes (e.g., 8 track, cassette, and video), magnetic disks, compact discs, digital video discs, etc., electronic merchandise is extremely vulnerable to damage such as being corrupted, being partially overwritten, being partially erased, etc. Because of this, a purchaser of electronic merchandise may lose valuable property because of a computer "glitch", virus, or crash.

Unlike merchandise distributed on traditional media, electronic merchandise is extremely easy to duplicate, and therefore difficult to verify as being the original and authorized copy of the merchandise, rather than a second, third, fourth, etc., generation and unauthorized copy of the merchandise. The difficulty in verifying authenticity is especially problematic when providing a resale mechanism for "used" electronic merchandise, or when purchasing "used" electronic merchandise, without running a risk of violating applicable copyright laws.

Accordingly, it is desirable to provide a service that verifies, repairs, and provides a resale mechanism for electronic merchandise.

SUMMARY OF THE INVENTION

It is therefore an object of the present invention to provide systems and methods for reselling electronic merchandise.

This and other objects of the invention are accomplished in accordance with the principles of the present invention by providing a service that verifies the integrity of electronic merchandise, repairs the electronic merchandise, and resells the electronic merchandise to consumers.

Initially, these systems and methods wait for a reseller to make a request to a service provider to resell electronic merchandise such as software, music, videos, images, etc. This request may be made via electronic mail, an on-line form, or any other suitable mechanism. Once the service provider receives a request to resell electronic merchandise, the service provider may ask the reseller to transfer the electronic merchandise to an Internet server and specify whether verification on the electronic merchandise should be performed and whether repair work should also be performed if the data is faulty. If a reseller does not specify whether to verify and repair electronic merchandise, the reseller's preferences from a previous transaction may be used. Once the data is received by the service provider, the data may be verified for authenticity and the content of the data may also be verified. If the content is damaged, repair work may be done using error correction methods.

Once verification and repair work are complete, the service provider may promote the error-free electronic merchandise in several ways. The service provider may advertise the merchandise on an advertising interface, auction the merchandise on a bidding interface, conduct a personal transaction to a person known to the reseller, or any other suitable form of promotion specified by a reseller. If no method of reselling is specified, the reseller's preferences from a previous transaction may be used.

When the service provider is notified of a buyer, the service provider may then notify the reseller of the transaction. The error-free data may then be transferred from the service provider to the buyer. Encryption techniques may be used to transfer the electronic merchandise to the buyer and to prevent the reseller from viewing the electronic merchandise once the transaction between a reseller and buyer is complete.

The reselling process ensures that complete and accurate data is transferred from the reseller to the buyer and that the copyright laws are maintained.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
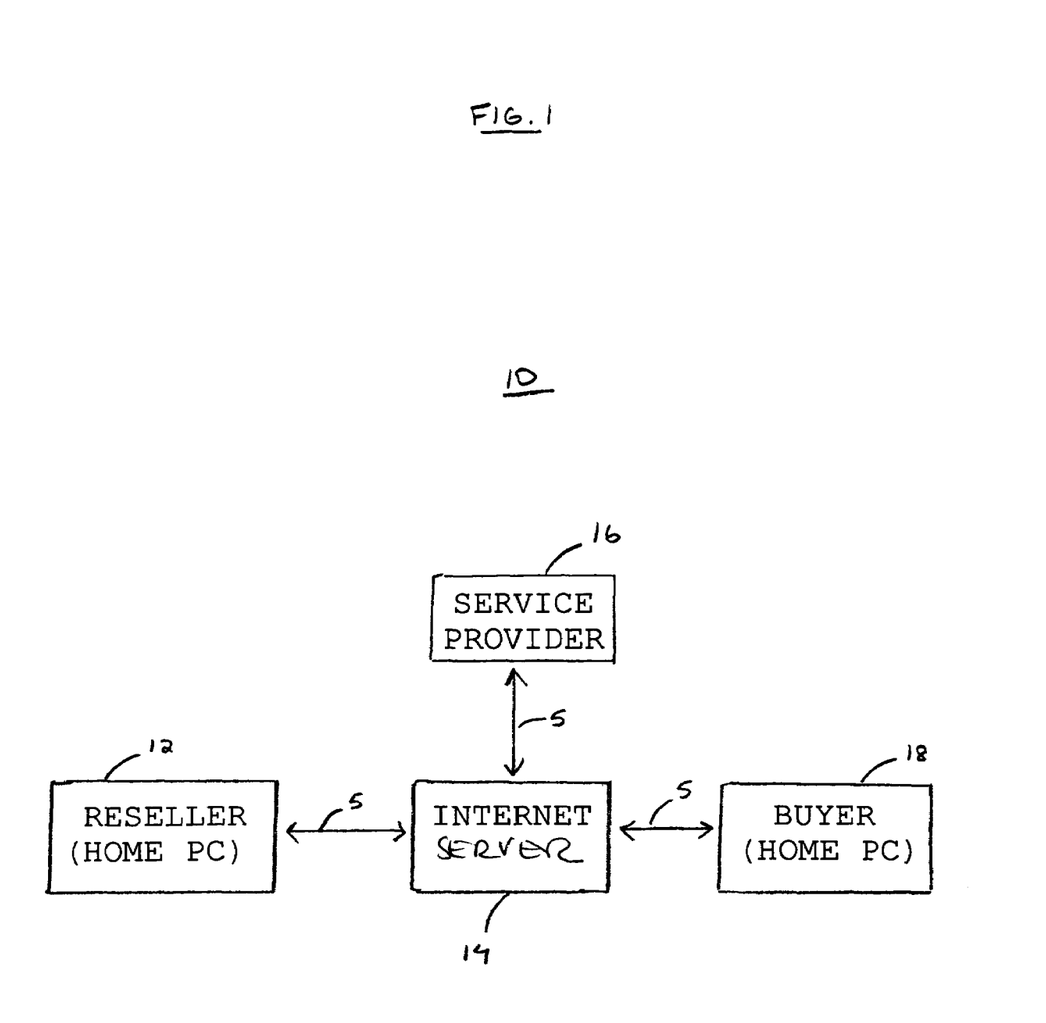
FIG. 1 is a block diagram of one embodiment of hardware that may be used to implement the present invention.

An illustrative system 10 for reselling electronic merchandise is shown in FIG. 1. As illustrated the service provided by the present invention may be implemented over an Internet server 14. Internet server 14 may be any suitable device for receiving, storing, and transferring data. Connected to Internet server 14 may be a service provider 16, which may be responsible for executing the transaction between a buyer 18 and a reseller 12 of electronic merchandise. Service provider 16 may be any suitable device for receiving, storing, and processing electronic merchandise. Reseller 12 and buyer 18 may be home personal computers (PCs) or any other suitable devices. There may be more than one reseller 12 and more than one buyer 18 connected to Internet server 14, although only one of each has been shown to avoid over-complicating the system.

Reseller 12, buyer 18, and service provider 16 may each be connected to Internet server 14 by separate communication links 5 or the same communication link 5. Communication link 5 may be any suitable, bi-directional communication path such as an Internet or network connection. Reseller 12, buyer 18, and service provider 16 may be connected by a local area network (LAN), a metropolitan area network (MAN), or a wide area network (WAN). Reseller 12, buyer 18, and service provider 16 may be part of separate networks (e.g., LAN, MAN, or WAN), but connected by an internetwork such as the Internet. Reseller 12, buyer 18, and service provider 16 may connect to Internet server 14 using a telephone modem, a cable modem, an Ethernet card, an Integrated Services Digital Network (ISDN) adapter, a wireless LAN adapter, a broadband modem, or any other suitable connection device. Communication path 5 may be a copper twisted pair (e.g., CAT 5, 10BASE-T, etc.) a coaxial cable (e.g., 10BASE-2, 10BASE-5, etc.), a fiber optic cable (e.g. 10BASE-F, single mode fiber, multimode fiber, etc.), an antenna and base station, or any other suitable communication path. Depending on the medium through which data is sent, the data may be sent as analog data, digital data, electromagnetic waves, or a combination of the same. The device that bridges reseller 12, buyer 18 and service provider 16 to communication path 5 may be responsible for converting the data into a form suitable for transmission over the selected communication medium. Data that is sent over Internet server 14 using communication path 5 may employ various technologies for transmitting data such as a T1 carrier, an ISDN connection, a Digital Subscriber Line (DSL), or any other suitable technology for conveying digital data along copper wires (e.g., twisted pair, coaxial cable, etc.)

Figure 2:
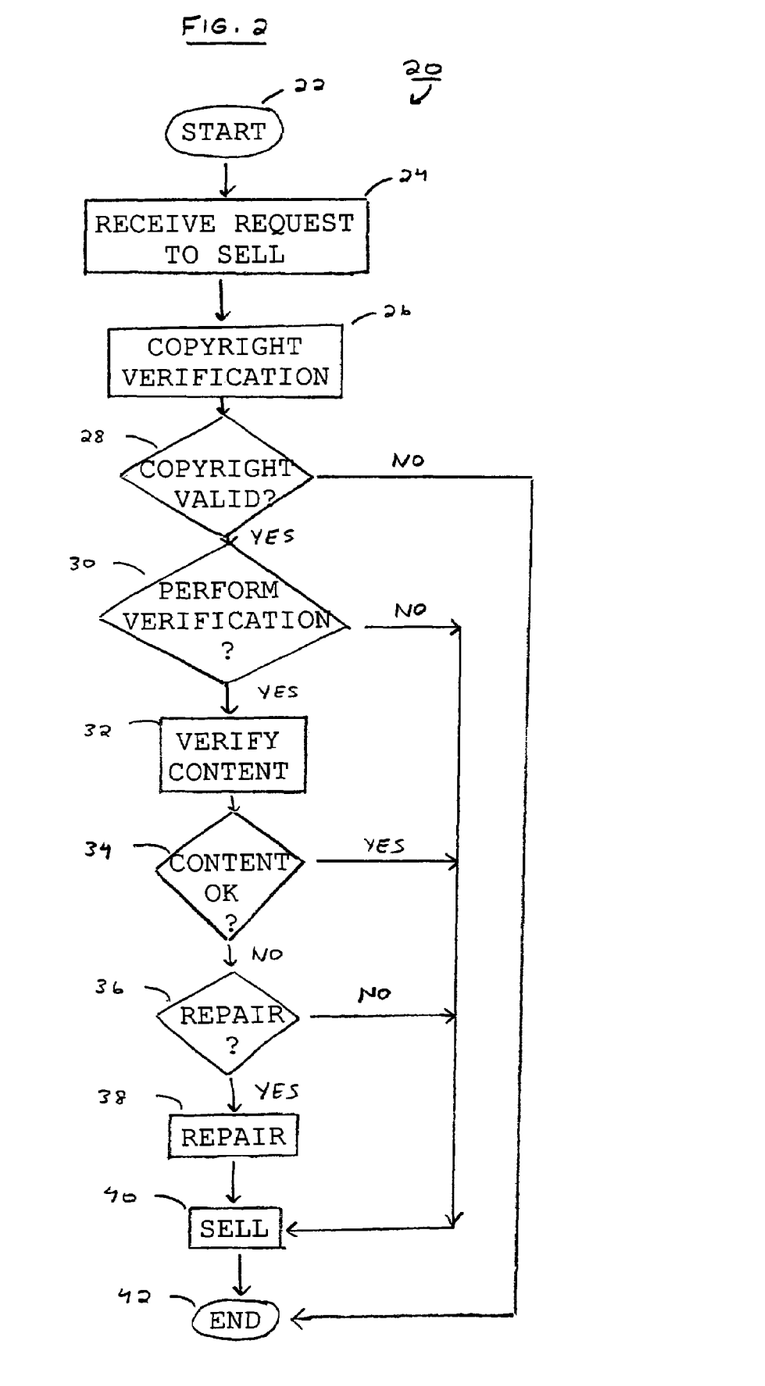
FIG. 2 is a flow diagram of a process for transferring electronic merchandise from a reseller to a buyer in accordance with one embodiment of the present invention.

An embodiment of a process 20 for transferring electronic merchandise from reseller 12 to buyer 18 via service provider 16 over Internet server 14 is illustrated in FIG. 2. As shown, once process 20 has begun at step 22, service provider 16 receives a request from reseller 12 to resell electronic merchandise at step 24. Reseller 12 may request to resell merchandise by sending electronic mail to service provider 16, by submitting an on-line form on a web page of service provider 16, or by any other suitable method.

Figure 3:
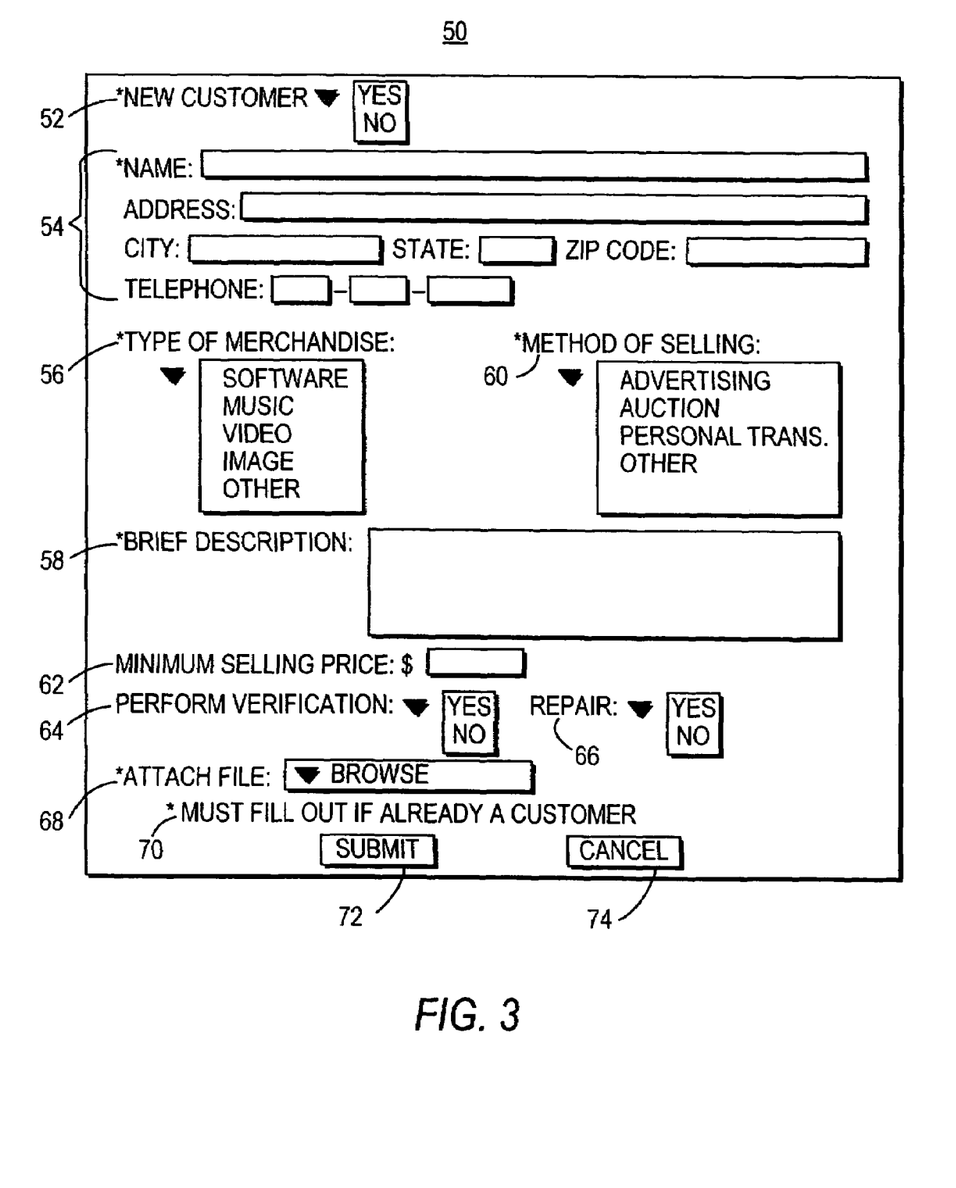
FIG. 3 is an illustrative display of an on-line form for a reseller to complete in accordance with one embodiment of the present invention.

For example, in response to a request to resell, service provider 16 may have reseller 12 fill out an on-line form 50 as shown in FIG. 3. Reseller 12 may be asked for information such as whether reseller 12 is a new or old customer 52, the reseller's biographical information 54, the type of electronic merchandise to resell 56, a brief description of the merchandise 58, the method of reselling 60, the minimum reselling price 62, whether the electronic merchandise should be verified or not 64, whether to repair the electronic merchandise if the data is invalid 66, the location of the electronic merchandise 68 on reseller 12, or any other relevant information that pertains to the sale of the electronic merchandise. "Type of Merchandise" 56 may have a pull-down bar in which reseller 12 may select "software", "music", "video", "images", or "other". If "other" is selected, reseller 12 may proceed to type in a new category of electronic merchandise not currently listed in the pull-down menu. "Brief Description" 58 may allow reseller 12 to enter in information about the electronic merchandise such as the name of the merchandise, a brief description of the features of the merchandise, and any other relevant information. This information may be displayed during promotion of the electronic merchandise to a potential buyer 18. "Method of Selling" 60 may also have a pull-down bar in which reseller 12 may select "advertisements", "auction", "personal transaction", or "other". If "other" is selected, reseller may type in a new method of selling not currently listed in the pull-down menu. "Perform Verification" 64 and "Repair" 66 may have a pull-down bar with an option to select either "Yes" or "No". "Attach File" 68 may allow reseller 12 to browse for the file location of the electronic merchandise so that the data may be transferred electronically over Internet server 14 to service provider 16 and eventually to buyer 18.

If reseller 12 is new to the service, reseller 12 may be required to fill in new information in all the blanks on form 50. Upon submission of the form, the new information will then be stored in a database in service provider 16. However, if reseller 12 has previously used the service, reseller's information may already be stored in a database in service provider 16. Reseller 12 may only be required to fill in the blanks marked by an asterisk 70, which may include "New Customer" 52, "Name" 54, "Type of Merchandise" 56, "Brief Description" 58, "Method of Selling" 60, "Perform Verification" 64, "Attach File" 68, and any other relevant information. However, if reseller 12 wishes to change his previous settings, reseller 12 may enter in new information, which may replace the information previously stored in the database. Upon completion of the form, reseller 12 may press "Submit" button 72 to send the information to service provider 16. Or reseller 12 may press "Cancel" button 74 to cancel the current order.

There may be several ways to transfer the electronic merchandise data from reseller 12 to service provider 16. Reseller 12 may use electronic mail to send the file as an attachment. Service provider 16 may access particular electronic merchandise files on Internet server 14 that were placed by reseller 12 using File Transfer Protocol (FTP) server, Hypertext Transfer Protocol (HTTP), or any other suitable method. Service provider 16 may also remotely login to reseller 12 using a user identifier and password to access the files on reseller 12. During the transfer of files, the data may be encrypted to prevent wire tapping and other methods of obtaining an unauthorized copy of the electronic merchandise. This may be implemented using Data Encryption Standard (DES) or any other suitable encryption technique.

Turning back to FIG. 2, once service provider 16 has received a request to sell along with an on-line form and a copy of the electronic merchandise at step 24, process 20 may verify the merchandise.

Verification may involve verifying the copyright of the merchandise as well as verifying the content of the merchandise.

Copyright verification may take place at step 26. The different forms of verifying the authenticity of copyrights may include digital watermarking, digital signatures, the International Standard Recording Code (ISRC), or any other method of copyright verification. Digital watermarks may include an identifying code that conveys information that may identify the originator of the merchandise or may identify the recipient of the merchandise. A watermark key or password may be required to extract such watermarks. In addition, watermarks may contain instructions that permit or limit the use of copying, which would be detected by recording devices. Digital fingerprinting is a type of watermark that uses a serial number to identify the owner of the merchandise as well as the recipient. A digital signature may be used in public key cryptosystems (PKCS). The original owner of merchandise uses a private key to generate a unique signature that verifies the authenticity of the merchandise. ISRC is a digitally encrypted code that conveys copyright information relevant to the electronic merchandise.

With unique identifying codes, there may be a universal database that maintains a record of all current and prior owners of all electronic merchandise. When service provider 16 receives the merchandise, service provider 16 may extract the code from the watermark, fingerprint, or digital signature and look up the code on the universal database. If the owner of the merchandise listed on the database is not reseller 12, then service provider 16 may determine that reseller 12 does not have a valid copy of the merchandise and may not permit a transaction to occur. However, if the information indicates that reseller 12 has an authentic copy of the merchandise, a transaction may be permitted to occur and the universal database may update its records to reflect buyer 18 as owning the copyright title to the particular merchandise.

At step 28, the validity of the copyright verification may be checked. If the merchandise is authentic, process 20 may then go to step 30. However, if the merchandise is a second, third, fourth, etc. generation copy of the merchandise or if reseller 12 still has possession of a copy of the merchandise that was previously sold, process 20 may go to step 42 and no further transaction may occur.

Process 20 may next inquire whether to perform a verification function on the merchandise at step 30. This determination may be based on a specific inquiry made to reseller 12 in response to receiving the request, or based upon information previously provided by reseller 12 to service provider 16. If reseller 12 has added new information or made changes to the on-line form, service provider 16 may update its database to add the preferences of a new customer or to reflect the new preferences of an existing customer.

If the merchandise is to be verified, process 20 may verify the electronic merchandise at step 32. This function may be performed by service provider 16 using any suitable method known in the art, for example, by comparing the merchandise to known-good merchandise, performing a checksum algorithm, using the cyclic redundancy check (CRC), or any other suitable error-detection method. In comparing the received merchandise with known-good merchandise, the data stream of both may be compared bit by bit. Data errors occurring prior to transmission and during transmission may be detected. Once an incorrect bit has been detected, an error flag may be set and process 20 may move to step 34. The data may also be compared using a checksum algorithm to compare the total number of bits or using the CRC to check for a remainder. If the number of bits do not agree or there is a remainder, an error flag may be set and process 20 may move to step 34. However, checksum and CRC algorithms may not always detect errors, and thus alternate and/or additional methods of verifying the content of electronic merchandise may be implemented.

Once the merchandise has been verified, process 20 may inquire whether the merchandise is intact at step 34. If the merchandise is not intact, as may be indicated by an indicator such as a flag generated in step 32, process 20 may determine whether to repair the merchandise at step 36. Similar to determining whether to perform verification or not, this determination may be based on information currently requested or previously received from reseller 12. If a repair is to be made, then the repair may be performed at step 38.

Repairing may be done using any suitable method known in the art, for example, by replacing the faulty portion of the merchandise from a known-good copy, by reconstructing the faulty portion, or by any other suitable error-correction technique. Using the known-good copy, the data stream bits for the entire merchandise may be compared bit by bit using logic operations. Upon finding an incorrect bit, that bit may be inverted (e.g. a "1" bit is inverted to a "0" bit, and a "0" bit is inverted to a "1" bit) and the process continues until all bits have been compared. Another similar method of correcting the data is by comparing packets of data instead of comparing one bit at a time. If the packets do not match, the corresponding packet of bits from the known-good copy replaces the faulty packet of the reseller's data. Data errors occurring prior to transmission and during transmission may be corrected.

Figure 4:
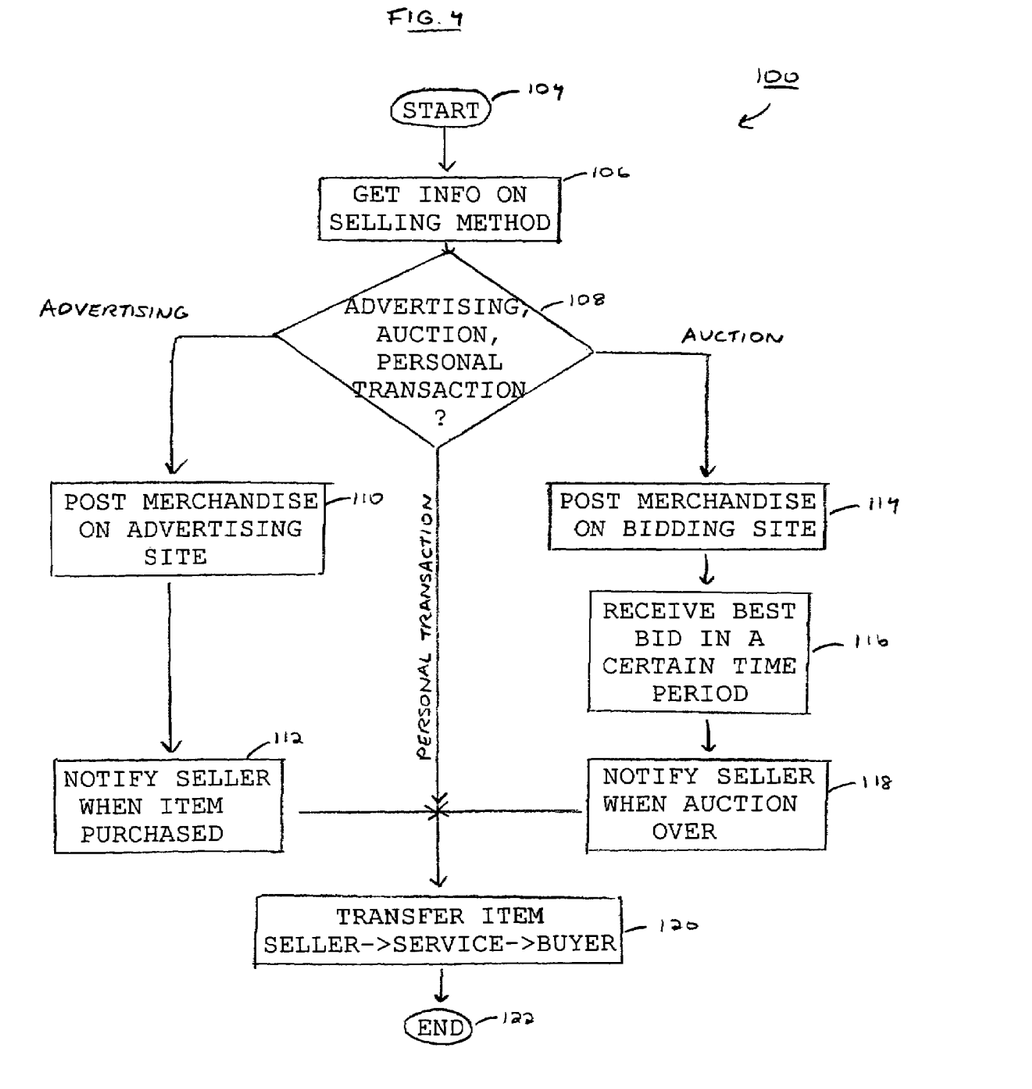
FIG. 4 is a flow diagram of a process for creating a transaction between a reseller and a buyer in accordance with one embodiment of the present invention.

Lastly, at step 40, process 20 may resell the merchandise to buyer 18. FIG. 4 shows a process 100 for creating a transaction between reseller 12 and buyer 18. As shown, once process 100 has begun at step 104, reseller 12 may select the sale to be performed in any method known in the art, for example, by displaying advertisements on various web sites, by hosting an auction, through a personal transaction, or any other suitable method. If another method is desired, the seller may proceed to type in a new method of selling not currently listed in the menu.

Process 100 may retrieve information on the selected selling method at step 106 and may inquire which selling method to implement at step 108. If the selected form of selling is advertising, process 100 may proceed to step 110 to post an advertisement indicating the name of the electronic merchandise, a brief description of the merchandise, the asking price, contact information, and any other relevant information. The advertisement may be posted on a web page on the service provider's site, on a general electronic merchandise postings web site, on a banner or pop-up window, or any other suitable advertising medium. Once potential buyer 18 has contacted service provider 16 about the electronic merchandise, process 100 moves to step 112 where service provider 16 notifies reseller 12 of interested buyer 18. Upon acceptance of the sale, the electronic merchandise may then be transferred from service provider 16 to buyer 18 at step 120 and the transaction process completed at step 122.

If the selected form of selling is through an auction, process 100 may proceed to step 114 to post on a bidding site the merchandise name, a brief description of the merchandise, a minimum bid, contact information, and any other relevant information. A bidding site may be a web page on the service provider's site, on a general auction web site, or any other suitable bidding medium. At step 116, the merchandise may be posted for a certain time period, after which time the highest bidder will have the opportunity to purchase the electronic merchandise. Upon receipt of the highest bid, service provider 16 may notify the highest bidder and process 100 may move to step 118 where service provider 16 notifies reseller 12 of interested buyer 18. Upon acceptance of the sale, the electronic merchandise may be transferred from service provider 16 to buyer 18 at step 120 and the transaction process completed at step 122.

If the selected form of selling is through a personal transaction, process 100 may proceed directly to step 120, transfer the electronic merchandise from service provider 16 to buyer 18 at step 120, and complete process 100 at step 122.

After service provider 16 transfers the merchandise to buyer 18, reseller 12 has lost all rights to the electronic merchandise. In order to prevent reseller 12 from violating copyright laws after delivering merchandise to buyer 18, encryption techniques may be used at step 120 to insure that once the electronic merchandise is transferred from reseller 12 to buyer 18, reseller 12 no longer has access to the electronic merchandise. There may be several options for service provider 16 to implement this copyright protection. Encryption software may be utilized to encrypt reseller's electronic merchandise so that reseller 12 is unable to view or hear the merchandise after reselling it. This encryption may be in the form of inserting extra data or noise to prevent a clear image or sound, placing a password block on the data, scrambling the data so that the data is no longer readable, or any other suitable method. Even if reseller 12 is able to maintain a copy of the merchandise previously sold, reseller 12 may be prevented from trying to resell the same merchandise because of a special identifier code in a watermark or digital signature that is maintained in a universal database.

Once the merchandise has been delivered to buyer 18, and reseller 12 no longer has access to the electronic merchandise, process 20 may complete at step 42.

As can be seen, systems and methods for reselling electronic merchandise are provided. It will be understood that the foregoing is only illustrative principles of the invention and that various modifications can be made by those skilled in the art without departing from the scope and spirit of the invention, which is limited only by the claims that follow.

What is claimed is:

1. A method comprising:
   receiving from a seller a request to transfer electronic merchandise;
   verifying that the seller of the electronic merchandise owns the electronic merchandise;
   verifying content of the seller's electronic merchandise by comparing the content of the seller's electronic merchandise to content of at least one known-good version of the electronic merchandise;
   determining that the content of the seller's electronic merchandise is not the same as the content of the at least one known-good version of the electronic merchandise;
   based at least in part on determining that the content of the seller's electronic merchandise is not the same as the content of the at least one known-good version of the electronic merchandise, repairing a faulty portion of the content of the seller's electronic merchandise; and
   causing the seller's electronic merchandise to be transferred to a buyer at least in part in response to verifying that the seller owns the electronic merchandise, verifying the content of the seller's electronic merchandise, and repairing the seller's electronic merchandise;
   wherein after the seller's electronic merchandise is transferred to the buyer the seller retains a copy of the electronic merchandise, the method further comprising causing the copy of the electronic merchandise retained by the seller to be modified thereby preventing the seller from using the copy of the electronic merchandise.

2. The method of claim 1, further comprising receiving the electronic merchandise from the seller; and
   wherein verifying the content of the seller's electronic merchandise comprises detecting data errors that occurred prior to receiving the request to transfer.

3. The method of claim 1, wherein repairing the faulty portion of the content of the seller's electronic merchandise comprises replacing the faulty portion of the content of the electronic merchandise with a portion of the content of the at least one known-good version of the electronic merchandise.

4. The method of claim 3, wherein repairing the faulty portion of the content of the seller's electronic merchandise comprises replacing one or more bits comprising the faulty portion of the content of the seller's electronic merchandise with one or more bits comprising the content of the at least one known-good version of the electronic merchandise.

5. The method of claim 1, wherein causing the copy of the electronic merchandise retained by the seller to be modified comprises causing the copy to be encrypted.

6. The method of claim 1, wherein causing the copy of the electronic merchandise retained by the seller to be modified comprises causing at least one of data and noise to be inserted into the copy.

7. The method of claim 1, wherein causing the copy of the electronic merchandise retained by the seller to be modified comprises causing a password block to be placed on the copy.

8. The method of claim 1, wherein verifying that the seller of the electronic merchandise owns the electronic merchandise comprises:
   obtaining from the seller's electronic merchandise an identifier code, wherein the identifier code has associated therewith an indication of a current owner of the seller's electronic merchandise;
   determining the indication of the current owner associated with the identifier code; and
   determining that the indication of the current owner comprises the seller.

9. The method of claim 8, further comprising transferring ownership of the seller's electronic merchandise from the seller to the buyer by changing the indication of the current owner associated with the identifier code from the seller to the buyer.

10. The method of claim 9, wherein the identifier code comprises an indication of at least one of an originator of the seller's electronic merchandise and the seller.

11. The method of claim 9, wherein the identifier code comprises at least one of a digital watermark, a digital fingerprint, and a digital signature.

12. The method of claim 9, wherein the identifier code has associated therewith the indication of the current owner of the seller's electronic merchandise and one or more indications of prior owners of the seller's electronic merchandise.

13. The method of claim 9, wherein determining the indication of the current owner comprises accessing a database that maintains the association between the identifier code and the indication of the current owner of the seller's electronic merchandise.

14. The method of claim 13, wherein transferring ownership of the seller's electronic merchandise from the seller to the buyer comprises updating the database such that the indication of the current owner associated with the identifier code of the seller's electronic merchandise comprises the buyer.

15. The method of claim 1, wherein causing the copy of the electronic merchandise retained by the seller to be modified comprises at least one of:
   causing data to be inserted into the copy,
   causing noise to be inserted into the copy,
   causing a password block to be placed on the copy,
   causing the copy to be encrypted, and
   causing the copy to be deleted.

16. The method of claim 1, wherein verifying the content of the seller's electronic merchandise comprises comparing one or more bits comprising the content of the seller's electronic merchandise to one or more bits comprising the content of the at least one known-good version of the electronic merchandise.

17. The method of claim 1, further comprising:
   receiving from the seller an indication to verify content of electronic merchandise; and
   in response to the indication to verify, verifying the content of the seller's electronic merchandise.

18. The method of claim 17, further comprising:
   receiving from the seller an indication to repair faulty content of electronic merchandise; and
   in response to the indication to repair, repairing the faulty portion of the content of the seller's electronic merchandise.

19. The method of claim 1, wherein verifying the content of the seller's electronic merchandise and repairing the faulty portion of the content of the seller's electronic merchandise are performed on a copy of the seller's electronic merchandise.

20. The method of claim 19, wherein causing the seller's electronic merchandise to be transferred to the buyer comprises causing the copy of the seller's electronic merchandise to be transferred to the buyer.

21. The method of claim 1, wherein owning the electronic merchandise comprises a right to transfer the electronic merchandise.

22. The method of claim 1, wherein the seller comprises a consumer that previously purchased the electronic merchandise that the seller is now requesting to transfer.

23. An apparatus comprising at least one computing device programmed to:
- receive from a seller a request to transfer electronic merchandise;
- verify that the seller of the electronic merchandise owns the electronic merchandise;
- verify content of the seller's electronic merchandise by comparing the content of the seller's electronic merchandise to content of at least one known-good version of the electronic merchandise;
- determine that the content of the seller's electronic merchandise is not the same as the content of the at least one known-good version of the electronic merchandise;
- based at least in part on determining that the content of the seller's electronic merchandise is not the same as the content of the at least one known-good version of the electronic merchandise, repair a faulty portion of the content of the seller's electronic merchandise; and
- transfer the seller's electronic merchandise to a buyer at least in part in response to verifying that the seller owns the electronic merchandise, verifying the content of the seller's electronic merchandise, and repairing the seller's electronic merchandise;
- wherein after the seller's electronic merchandise is transferred to the buyer the seller retains a copy of the electronic merchandise; and
- wherein the at least one computing device is further programmed to cause the copy of the electronic merchandise retained by the seller to be modified thereby preventing the seller from using the copy of the electronic merchandise.

24. The apparatus of claim 23,
wherein the at least one computing device is further programmed to receive the electronic merchandise from the seller; and
wherein to verify the content of the seller's electronic merchandise comprises to detect data errors that occurred prior to receiving the request to transfer.

25. The apparatus of claim 23, wherein to repair the faulty portion of the content of the seller's electronic merchandise comprises to replace the faulty portion of the content of the electronic merchandise with a portion of the content of the at least one known-good version of the electronic merchandise.

26. The apparatus of claim 23, wherein to cause the copy of the electronic merchandise retained by the seller to be modified comprises to cause the copy to be encrypted.

27. The apparatus of claim 23, wherein to cause the copy of the electronic merchandise retained by the seller to be modified comprises to cause at least one of data and noise to be inserted into the copy.

28. The apparatus of claim 23, wherein to cause the copy of the electronic merchandise retained by the seller to be modified comprises to cause a password block to be placed on the copy.

29. The apparatus of claim 23, wherein to verify that the seller of the electronic merchandise owns the electronic merchandise comprises to:
- obtain from the seller's electronic merchandise an identifier code, wherein the identifier code has associated therewith an indication of a current owner of the seller's electronic merchandise;
- determine the indication of the current owner associated with the identifier code; and
- determine that the indication of the current owner comprises the seller.

30. The apparatus of claim 29, wherein the at least one computing device is further programmed to transfer ownership of the seller's electronic merchandise from the seller to the buyer by changing the indication of the current owner associated with the identifier code from the seller to the buyer.

31. The apparatus of claim 30, wherein to determine the indication of the current owner comprises to access a database that maintains the association between the identifier code and the indication of the current owner of the seller's electronic merchandise.

32. The apparatus of claim 31, wherein to transfer ownership of the seller's electronic merchandise from the seller to the buyer comprises to update the database such that the indication of the current owner associated with the identifier code of the seller's electronic merchandise comprises the buyer.

* * * * *